United States Patent [19]
Zajac et al.
[11] 3,801,795
[45] Apr. 2, 1974

[54] MASTER CLOCK STANDBY SWITCHING CIRCUITRY

[75] Inventors: Chester Zajac, Thomaston; John Baltrush, Waterbury, both of Conn.
[73] Assignee: Robertshaw Controls Company, Richmond, Va.

[22] Filed: Sept. 7, 1972
[21] Appl. No.: 287,174

[52] U.S. Cl. .................... 307/66
[51] Int. Cl. .................... H02j 9/00
[58] Field of Search .......... 307/64, 66, 85, 86, 87, 307/141, 141.4, 141.8, 149, 150, 138, 139

[56] References Cited
UNITED STATES PATENTS
3,614,461 10/1971 Speer .................... 307/66

Primary Examiner—Herman Hohauser
Attorney, Agent, or Firm—Anthony A. O'Brien

[57] ABSTRACT

A power system for a master clock motor or the like which includes automatic switching circuitry for enabling instant switch-over from main power operation to standby power operation in the event of a temporary main power loss.

13 Claims, 3 Drawing Figures

MASTER CLOCK STANDBY SWITCHING CIRCUITRY

BACKGROUND OF THE INVENTION

1. Field of the Invention

The present invention pertains to power supply systems and, more particularly, to standby switching circuitry for a master clock motor or the like wherein a control circuit enables instantaneous switch-over between main power operation and standby battery power operation in the event of a temporary main power loss.

2. Description of the Prior Art

In many power supply system applications, the need for a reliable and ever-present power supply is of the utmost importance. This is especially true in the field of time indicators such as clock or elapsed time types, which provide output indications that are directly dependent on the presence of power supplied thereto. Because the possibility of power failure is not uncommon, it is important that the power supply system for time indicators or the like generally include a standby power supply and an associated automatic switching system for introducing the standby power supply into operation during a main power supply failure, such as is generally illustrated in U.S. Pat. No. 3,337,743 and No. 3,348,060. The typical prior art systems have not proved to be completely satisfactory because they are highly complex containing a large number of component parts resulting in high power dissipation during operation. In addition, such systems are incapable of the accuracy of operation required for applications such as time indicators or the like over long periods of use, especially under conditions of main power supply failure.

SUMMARY OF THE INVENTION

The present invention is summarized in that a power system for a master clock or the like includes a bias network, means for connecting a main source of power to energize said bias network, means for connecting a standby source of power to energize said bias network in the event of main power failure, an output line connected to the means for connecting a main source for transmitting a signal indicative of the presence of power from the main source of power, an oscillator energized by said bias network for generating a first repetitive output signal, means connected to said oscillator and said output line for generating a second repetitive output signal in accordance with said first repetitive output signal and the presence of energization on the output line due to main power presence and a third repetitive output signal in accordance with said first repetitive output signal and the lack of energization on the output line due to main power loss, and means responsive to said means for generating the second and third repetitive output signals for producing controlled output pulses for driving a master clock or the like.

It is an object of this invention to achieve automatic instantaneous switch-over between main and standby power sources of a power system.

It is a further object of this invention to maintain accurate and reliable energization of a load such as a master clock motor during conditions of main power loss.

Further objects and advantages of the present invention will be made apparent from the following description of the preferred embodiment taken in conjunction with the accompanying drawing.

DESCRIPTION OF THE PREFERRED EMBODIMENT

Figures 1, 2, 3:
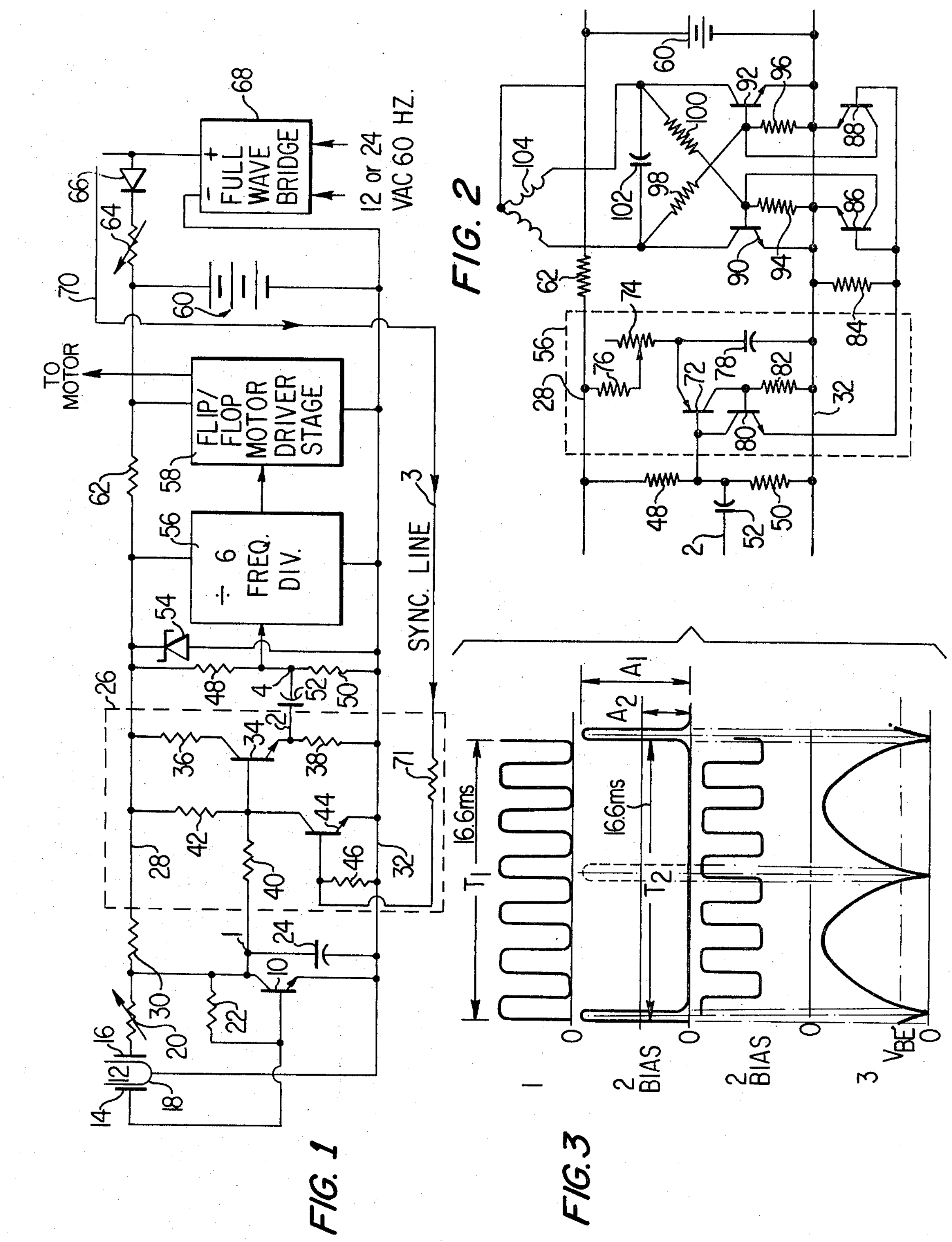
FIG. 1 is a schematic diagram of the circuitry of the present invention.
FIG. 2 is a schematic diagram of components shown in block form in FIG. 1.
FIG. 3 is a plurality of wave forms which occur at designated points in the circuitry of FIG. 1.

The present invention, as embodied in the circuitry of FIGS. 1 and 2, includes an oscillator stage having a transistor 10 interconnected with a tuning fork oscillator 12 which includes piezoelectric transducers 14 and 16 mounted on the tines of a tuning fork 18. The piezoelectric transducers 14 and 16 are connected between the base and collector of transistor 10 through the intermediary of an adjustable resistor 20 and the tuning fork 18 is coupled to the emitter. The base and collector are additionally shunted by a resistor 22. A capacitor 24 shunts the collector and emitter of the transistor 10.

A switching and synchronizing circuit, indicated generally at 26, includes a power line 28 connected to the collector of transistor 10 through the intermediary of a resistor 30, and a common line 32 connected to the emitter. A transistor 34 has its collector and emitter connected between the power lines 28 and 32 through a collector resistor 36 and an emitter follower resistor 38. The base of transistor 34 is connected to the collector of transistor 10 through a resistor 40 and to the power line 28 through the intermediary of resistor 42. A transistor 44 couples the base of transistor 34 to the common power line 32 through its collector and emitter circuit. A resistor 46 shunts the base of transistor 44 to the common power line 32.

A differentiating circuit including a series pair of resistors 48 and 50 connected across the power lines 28 and 32 additionally includes a capacitor 52 coupling the emitter of transistor 34 to the juncture of the series resistors. A zener diode 54 has its anode connected to the power line 28 and its cathode connected to the common power line 32.

A divide-by-six frequency divider 56 coupled to power lines 28 and 32 has an input joining the juncture of the series resistors 48 and 50 and an output connected to the input of a flip-flop motor driver stage 58.

The power side of the system includes a standby D.C. source 60 having its positive terminal connected to the power line 28 through a resistor 62 and its negative terminal connected to the common line 32. Shunting the D. C. source 60 is a series circuit including an adjustable resistor 64, a diode 66 and the output of a full wave bridge rectifier 68 having its input connected to a main A. C. supply (not shown), which may, for example, be a twelve or twenty-four volt supply. A synchronizing line 70 couples the positive output terminal of the full wave rectifier bridge 68 to the base of transistor 44 in the switching and synchronization circuit 26 through the intermediary of resistor 71.

The specific circuitry of the frequency divider 56 and the motor driver stage of FIG. 1 is shown in FIG. 2 wherein parts already described and numbered in FIG. 1 have been identically numbered. The frequency divider 56 includes a transistor 72 having a base connected to the common juncture of the series resistors of the differentiating circuit. The emitter of transistor 72 is connected to the power line 28 through the intermediary of an adjustable resistor 74 and a fixed resistor 76 in series, and is additionally connected to the common line 32 through the intermediary of a capacitor 78. A transistor 80 has its base and collector coupled to the collector and base respectively of transistor 72, the base of transistor 80 being additionally joined to the common power line 32 through resistor 82. The emitter of transistor 80 is coupled to the common power line 32 through a resistor 84 and to the commonly joined bases of a pair of transistors 86 and 88. The emitters of transistors 86 and 88 are directly joined to the common power line 32 and the collectors are directly coupled to the bases of transistors 90 and 92 while additionally being connected to the common power line 32 through the intermediaries of resistors 94 and 96. The collectors and bases of transistor 90 and 92 are cross-coupled through resistors 98 and 100, and the collectors are additionally joined by a capacitor 102 intermediary. A motor 104 such as for a master clock or the like and having a bifilar wound coil is connected to the collectors of transistors 90 and 92 and to the positive terminal of the standby D. C. power supply 60.

The wave forms of FIG. 3 will be described in conjunction with the various steps of the sequence of operation. The operation will first be described for the main power operating condition, that is, with a 60 Hz. A.C. signal present at the input of the full wave bridge rectifier 68. The bridge rectifier produces a 120 Hz. output signal as shown in the bottom wave form of FIG. 3 which is applied to the standby D.C. power source 60 as a trickle charge, and which also supplies the circuit power requirements. In addition, the 120 Hz. output signal is directly applied over synchronizing line 70 to the base of transistor 44 in the swtiching and synchronizing circuit 26, driving the transistor 44 into saturation for all amplitudes above $V_{BE}$.

The tuning fork oscillator stage generates a continuous 360 Hz. signal of substantially square wave shape at point 1, as shown in the upper most wave form in FIG. 3, which is applied to the base of transistor 34 of the switching and synchronizing circuit 26 through resistor 40. During the time when transistor 44 is in saturation, its collector-emitter circuit is effectively a short circuit acting to blank out the continuous 360 Hz. signal from the tuning fork oscillator stage and transistor 34 is biased off or only slightly conductive. During the relatively short periods that the transistor 44 is not in saturation, the 360 Hz. signal from the tuning fork oscillator stage is allowed to reach transistor 34, resulting in a pulse train output at point 2 having a low duty cycle, as shown in the second wave form from the top in FIG. 3 These low duty cycle pulses are differentiated and applied to the frequency divider 56 as synchronizing and triggering pulses. The frequency divider is a relaxation oscillator that is set by adjustable resistor 74 and the value selected for capacitor 78 to generate an output pulse to the flip-flop motor driver stage 58 either after a give predetermined time, which has been selected as 16.6 milliseconds, the time for capacitor 78 to reach a proper level of triggering or after six input pulses, whichever occurs first. As a result, the center pulse shown dotted in the wave form of FIG. 3, and every second pulse thereafter (not shown) in the pulse train, because they occur within 16.6 milliseconds of the previous trigger pulse to motor driver stage 58, are rendered ineffective and do not trigger the frequency divider 56. The frequency divider generates a 60 Hz. pulse output signal which is applied to a pair of steering transistors 86 to 88 associated with the inputs to a bistable flip-flop motor driver stage 58 to change the state of the flip-flop with each incoming pulse, each half of the flip-flop driving a winding of the master clock motor or the like.

During operation with the main A.C. power supply present, should phasing or a slight frequency differential exist between the 360 Hz. oscillator output pulses and the 120 Hz. rectified synchronizing signal from the bridge rectifier 68, the pulse outputs from the switching and synchronizing circuit 26 will be either of constant amplitude A1 or A2 or a combination of both. The amplitude is not critical since both levels are sufficient for triggering purposes after being differentiated and applied to the divide-by-six frequency divider stage 54.

In the event of a temporary main power failure, that is, with no A.C. power supplied to the full wave bridge rectifier 68, the synchronizing line 70 will not have a signal to transmit and accordingly transistor 44 will not be driven into saturation. The 360 Hz. square wave signal from the tuning fork oscillator stage will therefore not be blanked out by transistor 44 and will be transmitted to transistor 34 resulting in an output at point 2 which is substantially identical to the input applied to transistor 34 except for the addition of a D.C. bias level, as shown in the third wave form in FIG. 3. This wave form is then differentiated and the resulting signal at point 4 synchronizes and triggers the frequency divider 56 which converts the 360 Hz. input to a 60 Hz. output signal, to thereby drive the bistable flip-flop motor driver stage in the same manner as under main power operation.

The switch-over from main power to standby power occurs without a discontinuity, resulting in a continuous 60 Hz. signal to the flip-flop motor driver stage under all conditions. This is brought about due to the frequency divider providing an output for every sixth pulse or every 16.6 milliseconds from the previous pulse output, whichever occurs first. Since the 16.6 millisecond period references from each trigger input pulse to the frequency divider, even if switch-over occurs between trigger input pulses, the frequency divider will still trigger at the proper time, even though not yet having received six pulses from the 360 Hz. oscillator stage. Thereafter, the occurance of the six pulses and the 16.6 millisecond triggering period should coincide.

A power system for a master clock or the like has been disclosed having operational features and advantages over other systems in that the time on standby power can be much longer with much more accurate time keeping and with no loss of time in the switch-over process.

Inasmuch as the present invention is subject to many variations, modifications, and changes in detail, it is intended that all matter contained in the foregoing description or shown in the accompanying drawing shall be interpreted as illustrative and not in a limiting sense.

What is claimed is:

1. A power system for energizing a load comprising:

a bias network means;

means for connecting a main source of power to energize said bias network means;

means for connecting a standby source of power to energize said bias network means in the event of main power failure;

an output line means, connected to said means for connecting a main source, for transmitting a signal indicative of the presence of power from the main source of power;

oscillator means energized by said bias network means for generating a first repetitive output signal;

means, connected to said oscillator means and said output line means, for generating a second repetitive output signal in accordance with said first repetitive output signal and the presence of energization on the output line means due to main power presence and a third repetitive output signal in accordance with said first repetitive output signal and the lack of energization on the output line means due to main power loss; and means, responsive to said means for generating the second and third repetitive output signals, for producing controlled output pulses for energizing the load.

2. The invention of claim 1 further including a diode and adjustable resistor connecting the bias network means to the means for connecting a main source of power, the polarity of the diode being such as to enable energization of the bias network means and charging of the standby source of power by the main source of power during operation.

3. The invention of claim 1 wherein the second repetitive output signal takes the form of a pulse train having a frequency which is less than the frequency of the first and third repetitive output signals.

4. The invention of claim 3 wherein the frequencies of the first and third repetitive output signals are equal.

5. The invention of claim 1 wherein the means responsive to said means for generating the second and third repetitive output signals includes a bistable flip-flop connected to the bias network means and having a pair of outputs for energizing the load.

6. The invention of claim 1 wherein the means responsive to said means for generating the second and third repetitive output signals includes a frequency divider.

7. The invention of claim 6 wherein the frequency divider produces an output pulse in response to a given number of input pulses or after a predetermined time.

8. The invention of claim 1 wherein the means for generating the second and third repetitive output signals is a switching and synchronizing circuit comprising a transistor stage having an input connected to the oscillator means and an output and means responsive to the presence of a signal on the output line means for shorting the input of the transistor stage.

9. The invention of claim 8 wherein the means for shorting comprises a transistor having its collector and emitter connected across the intput of the transistor stage, and its base connected to the output line means.

10. The invention of claim 9 including differentiator means connected between the output of the transistor stage and the means for producing controlled output pulses for energizing the load.

11. The invention of claim 10 wherein the means for producing controlled output pulses includes a frequency divider responsive to the differentiator means and a bistable flip-flop motor driver stage controlled by the frequency divider.

12. A power system for continuously pulsing a load at a given frequency during switch-over between main and standby sources of power comprising:

a bias network means;

means for connecting a main source of power to energize said bias network means;

means for connecting a standby source of power to energize said bias network means in the event of main power failure;

an output line means, connected to said means for connecting a main source, for transmitting a signal indicative of the presence of power from the main source of power;

oscillator means energized by said bias network means for generating a repetitive signal at a frequency greater than said given frequency;

means, connected to said oscillator means and said output line means, for generating pulses at a lesser frequency than said greater frequency in accordance with the greater frequency repetitive output signal from said oscillator means and the presence of energization of the output line means due to main power presence and at said greater frequency in accordance with the greater frequency repetitive output signal from said oscillator means and the lack of energization on the output line means due to main power loss; and means responsive to said pulses for producing controlled output pulses at said given frequency for application to the load.

13. The invention of claim 12 wherein the means responsive to pulses for producing controlled output pulses comprises a frequency divider which generates an output pulse in response to a given number of input pulses or after a perdetermined time.

* * * * *